J. T. THOMPSON.
MEANS FOR LUBRICATING AMMUNITION.
APPLICATION FILED JUNE 16, 1917.

1,307,066.

Patented June 17, 1919.
6 SHEETS—SHEET 1.

J. T. THOMPSON.
MEANS FOR LUBRICATING AMMUNITION.
APPLICATION FILED JUNE 16, 1917.

1,307,066.

Patented June 17, 1919.
6 SHEETS—SHEET 4.

Inventor
John T. Thompson.
By Roberts, Roberts & Cushman
Attorneys

J. T. THOMPSON.
MEANS FOR LUBRICATING AMMUNITION.
APPLICATION FILED JUNE 16, 1917.

1,307,066.

Patented June 17, 1919.
6 SHEETS—SHEET 6.

Inventor
John T. Thompson.
By Roberts, Roberts & Cushman
Attorney

UNITED STATES PATENT OFFICE.

JOHN T. THOMPSON, OF NEWPORT, KENTUCKY.

MEANS FOR LUBRICATING AMMUNITION.

1,307,066. Specification of Letters Patent. Patented June 17, 1919.

Application filed June 16, 1917. Serial No. 175,152.

*To all whom it may concern:*

Be it known that I, JOHN T. THOMPSON, a citizen of the United States, residing at Newport, in the county of Campbell and State of Kentucky, have invented new and useful Improvements in Means for Lubricating Ammunition, of which the following is a specification.

The present invention relates to firearms or guns, and has particular reference to means either integrally or detachably associated with a gun for effecting lubrication between the contacting surfaces of the case of a cartridge, shell, or other type of fixed ammunition, and the chamber of the gun or firearm containing the ammunition, preferably by lubricating the case of a cartridge, shell or other type of fixed ammunition before it is seated in the chamber.

It has been found that in the use of rapid-fire guns, or automatic firearms, when a lubricant is not provided between the ammunition case and the firing chamber of the gun or firearm, the friction therebetween, during extraction of the empty case from the chamber immediately after the ammunition has been fired, is variable, and at times, excessive, due to the residual pressure of powder gases within the ammunition case. The friction during extraction of the empty ammunition case, at times, becomes so excessive that it interferes with the operation of the gun, either by stopping the action of the gun abruptly or by causing the head of the ammunition case to be separated from the body of the case by a rupture, or technically stated, by a failure of the ammunition case in tension. The gun or firearm will operate very satisfactorily for a period of time but when a number of rounds have been fired, it will fail to operate as smoothly and steadily as it should, and the action will be jerky and faulty.

It is also noted that in rapidly firing a hand-operated rifle from the shoulder or hip, commonly known as "rapid-fire," with dry cartridges, the ordinary friction, or the extraordinary friction due to residual powder gas pressures during extremely quick operation of the bolt, (the friction in both cases being that between the empty cartridge case and the chamber) is so great as to interfere with the quick and easy handling or manupulating of the bolt.

This faulty action of a gun or firearm, where no means is provided for lubricating the contacting surfaces of the ammunition case and the firing chamber, will be noted in all types of rapid-fire guns, and hand operated rifles but it is particularly noticeable in guns of the type wherein the residual powder gases act to automatically eject or to assist the extractor in extracting the empty ammunition case from the firing chamber. The reason for this is obvious for if the friction between the firing chamber and the case is variable, due to different degrees of annealing the case during manufacture and to the tolerances in diametrical or longitudinal dimensions required in the commercial manufacture of cartridges, or other causes, the ejection of the various empty ammunition cases will take place at different pressures, and therefore, the shells or cases will not be ejected at regular intervals, as they should be, nor will they be ejected with equal ease or rapidity. It is, of course, well known that if two bodies are in sliding contact with each other, such, for instance, as a piston within a cylinder, the movement is more uniform and smooth when a lubricant is employed between the contacting surfaces than when it is not.

The object of the present invention is to provide means for obtaining proper lubrication between the contacting surfaces of the ammunition case and the firing chamber of the gun or firearm, so as to reduce and make more uniform and constant the frictional resistance between the contacting surfaces, and thus facilitate the extraction of the ammunition case from the chamber and improve the operation of the firing device.

More particularly is it the object of my invention to provide a gun or firearm, or the mechanism for automatically feeding the ammunition thereto, during operation of the gun or firearm, with lubricating means so disposed with respect to the firing chamber as to effect proper lubrication of the contacting surfaces between the ammunition case and the firing chamber. In the preferred forms shown and described in the present illustrated disclosure of my invention, the lubricant is applied to the ammunition while the latter is passing into the magazine or from the magazine to the firing chamber or both; but, of course, the desired lubrication may be secured in various other ways, it being only essential that the ammunition be lubricated by means associated with the gun, or firearm, or the means for feeding the ammunition to the firing chamber, or that lubrication be effected during or after its introduction to the gun mechanism.

It is obviously recognized that lubrication between the ammunition case and the firing chamber of the gun is desirable to insure proper operation of the firearm or gun, but so far as I am aware, no means attached to or forming part of the firearm or gun have been devised for lubricating a cartridge, or other ammunition, while being loaded into the magazine or fed from the magazine, or both, or after the cartridge has been placed in position to be fed to the firing chamber from a magazine, drum, belt, metallic strip or other feeding device. It is old, of course, to apply by hand or means not attached to or associated with the firearm an oil or grease to the case of a shell or cartridge, before it is introduced into the mechanism for feeding the same to the firing chamber, or before it is placed in the chamber by hand, so as to reduce friction between the cartridge case and the chamber of the gun. Oil, grease or wax may be placed on the ammunition at the munition plant, and so delivered in a lubricated condition to the user, but due to various and obvious disadvantages, this condition is not found to be practicable; so that for use in firearms and guns of all descriptions, at present, fixed ammunition is furnished riflemen and artillerymen in a dry condition.

By the term "ammunition" is meant any fixed loading for firearms or guns of whatever character or whatever type of gun, and this term will hereafter be used in its broad sense, to include cartridges, shells, and the like.

By the terms "firearm" or "gun" are meant any type of firing piece in which fixed ammunition is employed, and I will hereafter use the term "gun" to cover and include rifles, pistols, revolvers, machine guns, and the like, whether the same be of the semi-automatic, automatic, or the hand-operated types.

The term "lubricant" is not limited to those substances usually known as lubricants, such as oils, grease, waxes and the like, but is intended to cover any substance or agent which will reduce the friction between the ammunition case and the firing chamber of the gun, whether this material be of powdered form or in a vaporous, semi-liquid, liquid or solid state.

In the drawings herewith, and in the description accompanying those drawings, the invention is shown as applied to a magazine rifle of any ordinary or desired construction; the ammunition is shown as a cartridge made up of a charged metallic case or shell with a bullet mounted therein in the usual manner, and a lubricating means is shown as comprising a pad or a series of pads to which the lubricant has been applied, and against which the ammunition is brought into contact while the latter is passing into the magazine or from the magazine to the firing chamber, or both, but it is to be understood that this illustration and description is merely one adaptation of the invention and is in no way restrictive of the invention.

Figure 1:
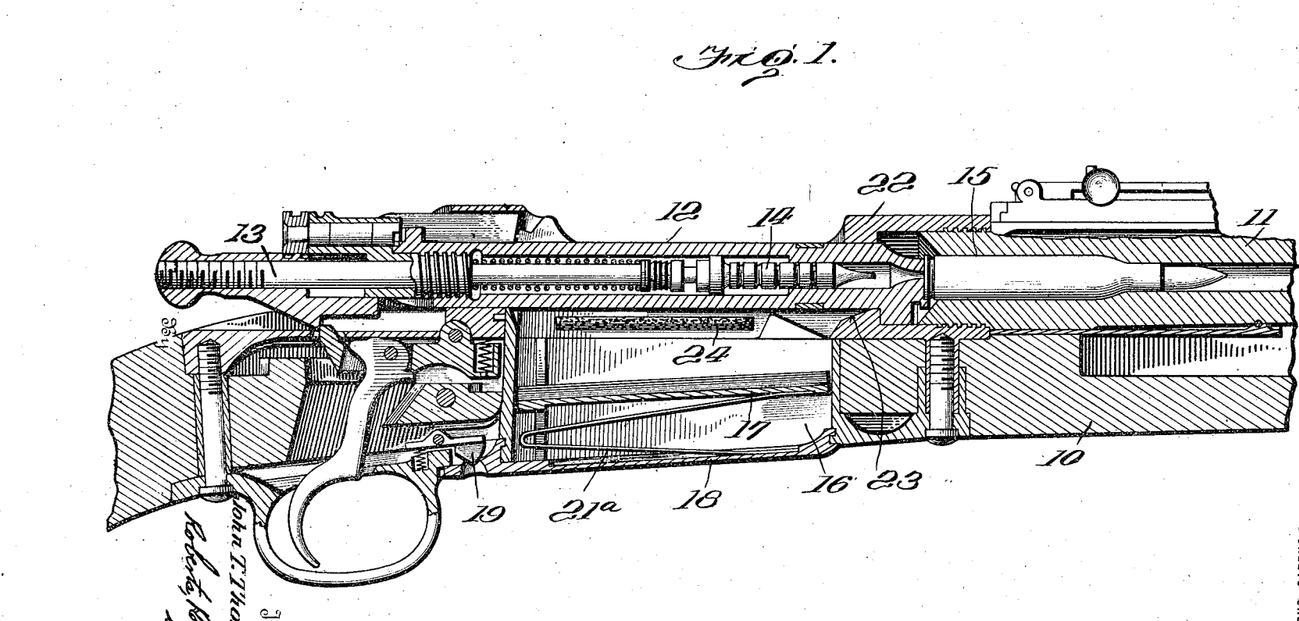
Figure 1 is a longitudinal sectional view through so much of a magazine rifle as is necessary to show the application of one embodiment of my invention thereto, in this embodiment the lubricating pads being disposed within and extending longitudinally of the magazine opening of the receiver.

Referring to the drawings, and more particularly to Fig. 1, wherein is disclosed so much of a regulation rifle now used in the United States Army as is necessary to illustrate the application of my invention thereto, 10 designates the stock, 11 the barrel, 12 the firing bolt, 13 the firing pin rod, 14 the striker, 15 the firing chamber of the barrel, and 16 the magazine. Located within the magazine is a follower 17, and the magazine is closed by a floor plate 18, locked in position by a floor plate catch 19. The follower plate is normally urged upwardly so as to retain the uppermost cartridge 20 against the overhanging ledge 21, (Fig. 2) by means of a magazine spring 21ª. Between the magazine and the barrel is a receiver 22 having a slanting or inclined feeding surface 23, which directs the cartridges, during the feeding of the same from the magazine to the firing chamber, into the firing chamber. It is not deemed necessary to describe each of the parts illustrated, for the construction of these parts and the operation of the gun or rifle will be readily understood by those familiar with this art. It is understood, of course, that during the operation of the gun and upon extraction of the empty ammunition case, the bolt 12 is withdrawn from the magazine opening and the follower urges the uppermost shell upwardly against one of the overhanging ledges 21. Upon the forward movement of the bolt, its forward end will engage the uppermost edge of the cartridge and force the same forwardly, and the cartridge will ride up the inclined feeding surface 23 into the firing chamber.

Figures 2, 3, 4, 5, 6, 23, 24:
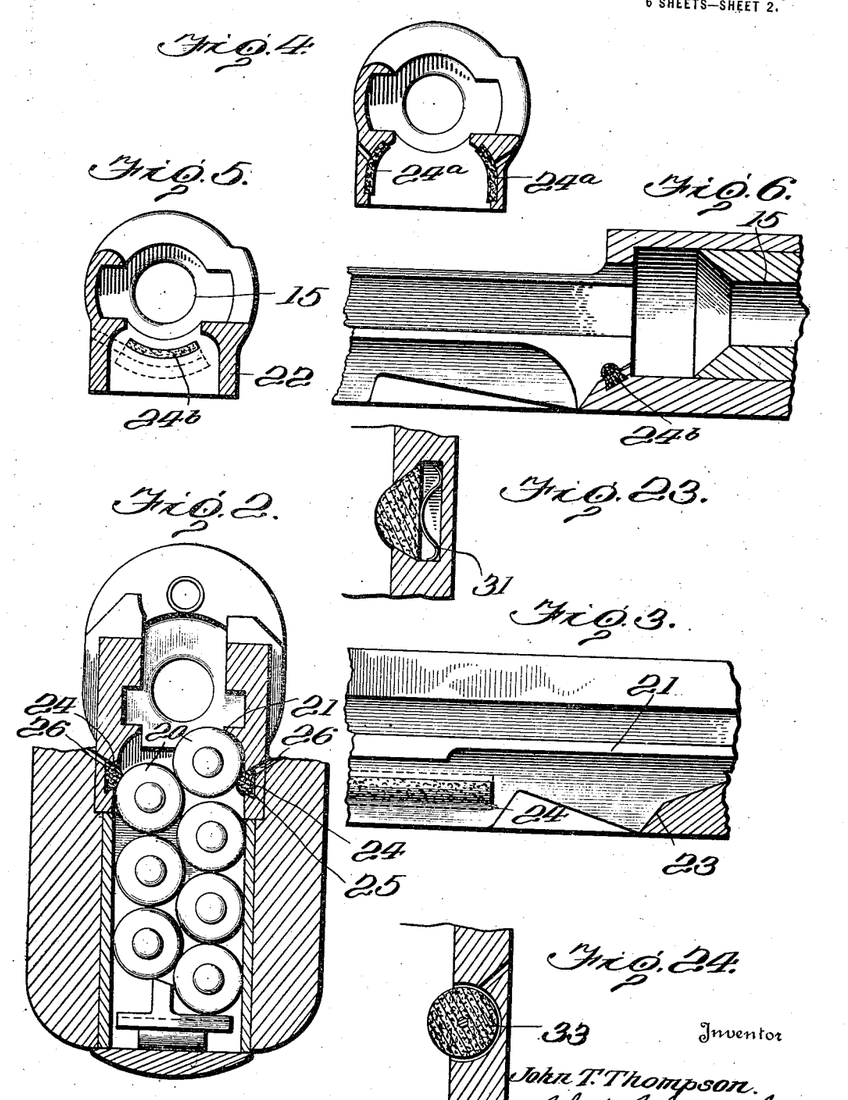
Fig. 2 is a vertical sectional view taken transversely through the receiver and magazine of a gun structure similar to that shown in Fig. 1.
Fig. 3 is an enlarged detail view taken on a longitudinal line through the magazine opening of the gun shown in Fig. 2.
Fig. 4 is a sectional view taken transversely through the receiver of the gun shown in Fig. 1 and shows a slightly different arrangement of lubricating pads.
Fig. 5 is a view similar to Fig. 4 but the lubricating pad is disclosed as located upon the inclined surface up which the cartridge rides when forced into the firing chamber.
Fig. 6 is a longitudinal view taken centrally through Fig. 5.
Figs. 23, 24 and 25 are enlarged fragmentary sectional views through portions of the wall of the magazine opening of the receiver and are illustrative of the various changes in details of which my invention is susceptible.
Figure 7:
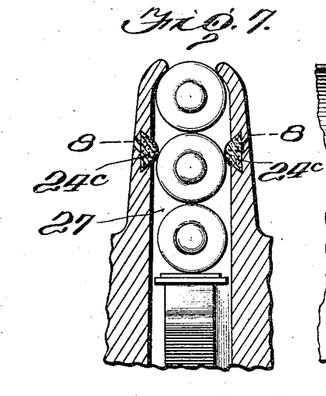
Fig. 7 is a transverse vertical sectional view through the magazine portion of another type of gun, and shows another embodiment of my invention.

In the embodiments of my invention disclosed in Figs. 1 to 3, the lubricating means is shown as comprising pads 24 located in the magazine opening of the receiver 22 immediately above the upper edge of the magazine 16. These pads may be mounted in any suitable manner, but by way of illustration, they are disclosed as being located in grooves 25 extending longitudinally of the magazine opening of receiver 22, and these grooves have their opposite edges undercut so that the edges of the pads may engage in the undercut portions of the grooves, and are retained in position thereby.

The pads may be of any suitable material, and if desired, they may be constructed of any absorbent felt or fabric. For the purpose of introducing a lubricant to the pads I have disclosed oil holes 26 extending through the stock of the gun and the metallic walls of the magazine opening, and, of course, one or more of these oil ducts may be employed for each pad.

It will be seen that during the operation of the gun and while the cartridge is being loaded into the magazine or is passing from the magazine to the firing chamber, the cartridges are successively brought into engagement with one of the pads 24 so that the cartridges are delivered to the firing chamber in a lubricated condition. The pads are located in the path of travel of the cartridges to the firing chamber, so that proper lubrication of each cartridge is insured. When employing a magazine the lubricating means should be so positioned that each of the cartridges is brought into operative relation to the lubricating means in transit to the firing chamber. The cartridges are fed into the magazine 16 through the magazine opening of the receiver 22, and while being so introduced they come into contact with the lubricating pads 24. I have found that it is not necessary to lubricate the entire circumferential external surface of the cartridges or ammunition, and that it is only necessary to apply the lubricant to the cartridge along one or more lines of its periphery. The amount of lubricant necessary between the external surface of the ammunition and the internal surface of the firing chamber to insure a smooth operation of the gun, is comparatively small, the amount depending, of course, upon the type of gun used.

In Fig. 4, the pads 24ª are also located in the internal walls of the magazine opening of the receiver but in this embodiment, the pads extend over greater surfaces so that a greater amount of lubricant is applied to the cartridges as they pass from the magazine to the firing chamber.

In Figs. 5 and 6, instead of locating the pads adjacent the upper edge of the magazine 16, I have illustrated a pad 24ᵇ mounted upon the inclined surface 23 up which the cartridges ride when being fed into the firing chamber 15. It will be seen that as the cartridges ride up the inclined surface, they will wipe against the pad so as to take up a proper amount of lubricant.

Figure 8:
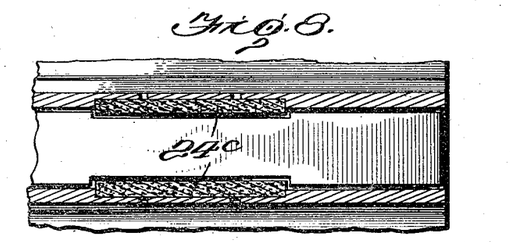
Fig. 8 is a sectional view taken on the line 8—8, Fig. 7.
Figure 9:
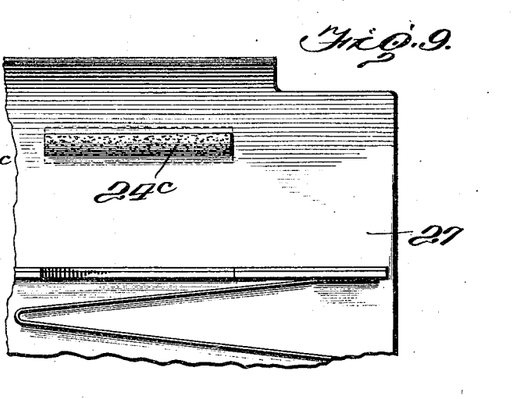
Fig. 9 is a vertical longitudinal view through the structure shown in Fig. 7.

In Figs. 8 and 9, I have shown my invention applied to a different type of magazine, the cartridges being arranged in a single column instead of staggered as in Fig. 2, the arrangement being employed in the Ross rifle. The magazine is designated by the numeral 27 and adjacent the upper edge of this magazine are located pads 24$^c$, these pads being similar in structure, and being mounted in a manner like those shown in Figs. 1 to 3.

Figure 10:
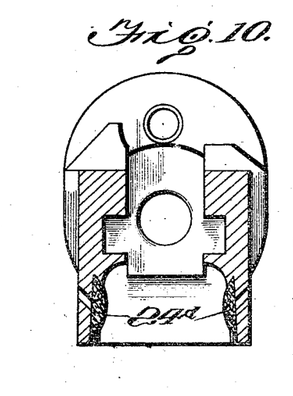
Figs. 10 and 11 are similar to Figs. 2 and 3 but show a slightly different arrangement of pads.
Figure 11:
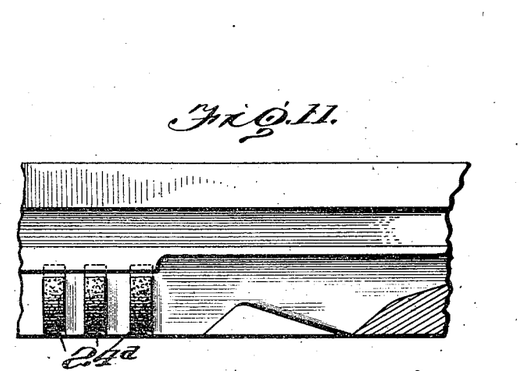
Figure 15:
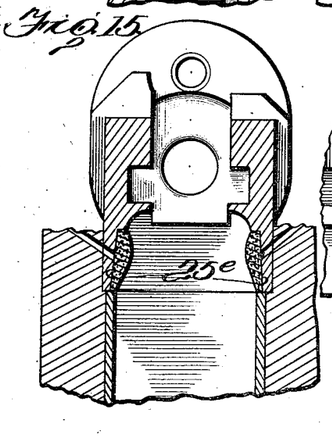
Figs. 15 and 16 are similar to Figs. 10 and 11 but show a slightly different manner of mounting the pads within the magazine opening.

Figs. 10 and 11 are similar to Figs. 2 and 3 but in this embodiment, instead of locating continuous pads longitudinally in the walls of the magazine opening, I have illustrated a series of small spaced apart pads 24$^d$. The grooves in which the pads 24$^d$ are mounted, are undercut at their upper edges for the reception of the upper ends of the pads. It is, of course, obvious that any number of pads 24$^d$ may be employed along each side of the magazine opening, and that their manner of attachment may be varied as desired. For instance, the grooves in which the pads are located may have their vertical edges undercut as designated by the numeral 25$^e$, in Figs. 15 and 16.

Figure 12:
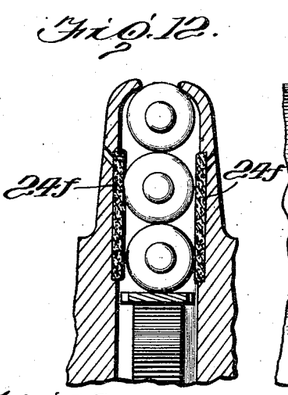
Figs. 12, 13, and 14 are similar to Figs. 7, 8 and 9 respectively, but show another embodiment of my invention.
Figure 13:
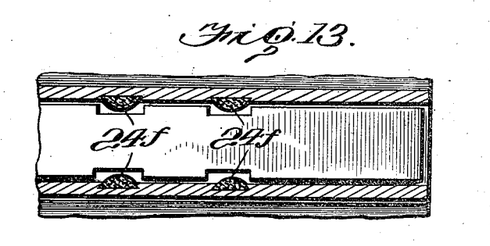
Figure 14:
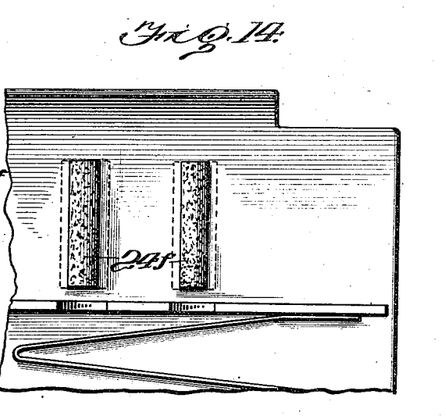

In the embodiment shown in Figs. 12, 13 and 14 I have shown the pads 24$^f$ as being disposed vertically of the magazine chamber of a single column feed magazine. As the cartridges are moved upwardly, they will engage against the pads 24$^f$ so as to receive the lubricant, as shown in Fig. 12.

Figure 17:
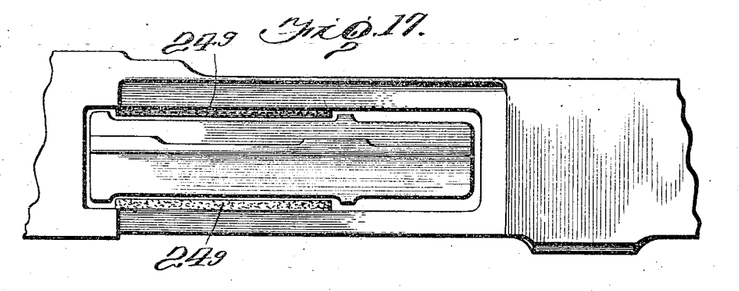
Fig. 17 is a top plan view of that portion of a rifle in which the magazine opening or well is located, and the lubricating pads are shown as located within the magazine.
Figure 18:
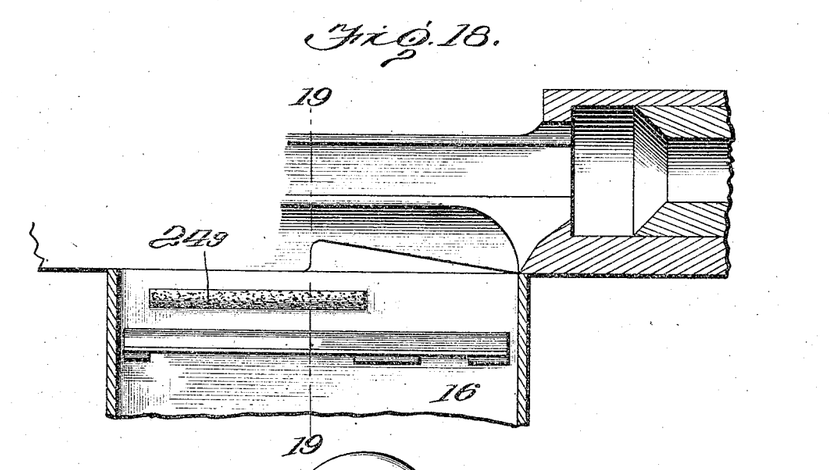
Fig. 18 is a vertical longitudinal section through Fig. 17.
Figure 19:
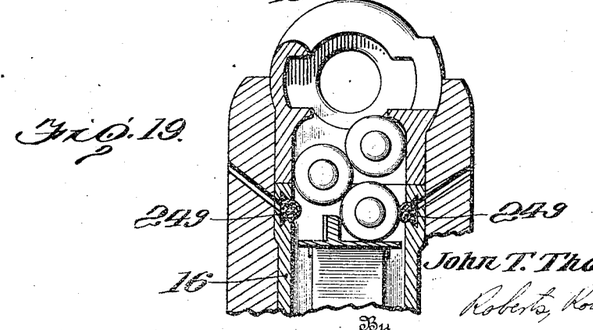
Fig. 19 is a vertical transverse section taken on the line 19—19—Fig. 18.

In Figs. 17, 18 and 19 the same structure of gun is illustrated as that shown in Figs. 5 and 6. The pads 24$^g$ instead of being mounted within the magazine opening of the receiver as shown in Figs. 2 and 3, are located within and adjacent the upper edge of the magazine 16 and extend longitudinally thereof.

Figure 20:
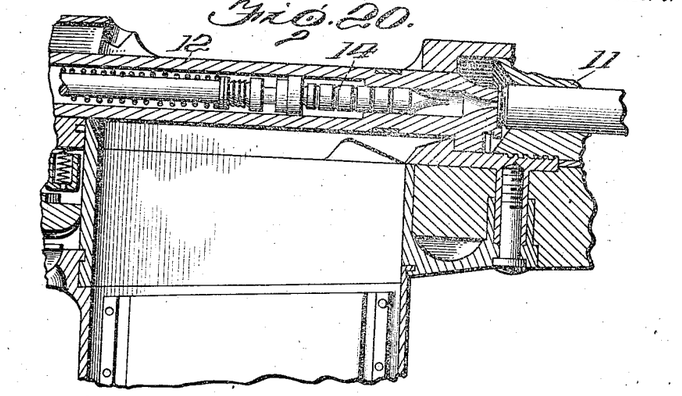
Fig. 20 is a vertical longitudinal sectional view through the magazine section of the rifle shown in Fig. 1, and to which an extension magazine is secured, the extension magazine having lubricating pads against which the cartridges are adapted to engage.
Figures 21, 22:
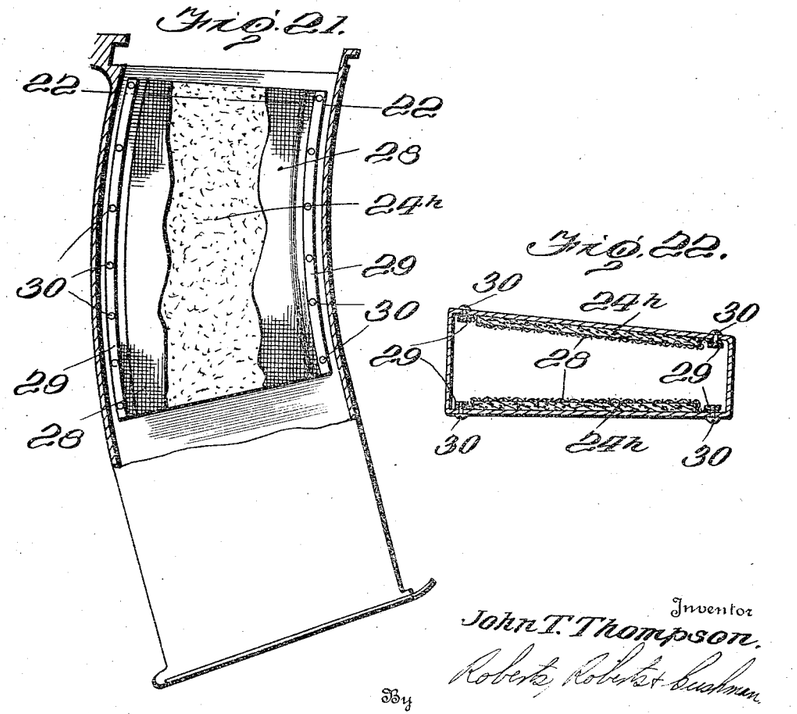
Fig. 21 is a side elevational view of the extension magazine parts of the magazine being broken away to more clearly illustrate the lubricating pad.
Fig. 22 is a transverse section taken on the line 22—22 of Fig. 21.

Referring now to the embodiment shown in Figs. 20, 21 and 22, wherein I have illustrated an extension magazine secured to the regulation rifle of the United States Army, the magazine is disclosed as having, on its opposite walls, lubricating pads 24$^h$, and in this particular illustrative disclosure, these pads cover about one-half of the opposite walls of the extension magazine. It is, of course, obvious, however, that the pads may cover the entire surface of the walls of the magazine, or they may be limited in width and be located adjacent the upper edge of the magazine, it being only essential that the pads are so located that the cartridges stored in the magazine may be properly lubricated while passing to the firing chamber. If desired the pads may be covered with a wire netting 28, secured in place by metallic strips 29 and screws 30 the latter being passed through suitable openings in the magazine walls and being threaded into openings in the strips 29.

Figures 16, 25:
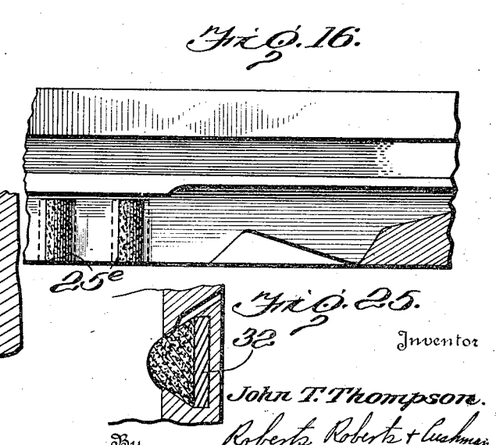

It is, of course, obvious that while I have shown in some of the preceding embodiments, the lubricating means as comprising pads of felt mounted within grooves, I do not wish to restrict myself to this particular type of lubricating means. The pads may be of any suitable construction and may be attached in any suitable manner. If desired, the pads may be resiliently urged outwardly of the grooves, by means of a spring 31 as shown in Fig. 23, or a pliant or soft rubber pad 32 as shown in Fig. 25. Instead of a stationary pad, a rotating brush or roller may be employed, and as illustrating one of the innumerable modifications of which my invention is susceptible, I have shown in Fig. 24 the lubricating means as comprising a roller 33. The magazines herein referred to may be either fixedly or detachably mounted on the gun.

It will be noted that in each of the embodiments of my invention hereinbefore described the cartridges or ammunition are lubricated after or during their introduction to the gun mechanism or both. During the movement of the cartridges into, or from the magazine to the firing chamber, the cartridges engage against the lubricating means which are placed in their path so that the cartridges are suitably lubricated, and proper lubrication between the external surface of each cartridge and the chamber is insured. However, the particular means and the manner for lubricating the cartridges are shown by way of illustration only; and it is understood that proper lubrication of the cartridges during or after their introduction to the gun mechanism, or the means for feeding the cartridges thereto, may be effected in any suitable manner.

I claim:

1. A gun comprising a firing chamber, and having means on the gun for lubricating the ammunition before it is seated in the firing chamber.

2. A gun comprising a firing chamber, means for feeding ammunition to the firing chamber, and means associated with the feeding means for lubricating the contacting surfaces between the firing chamber and the ammunition.

3. A gun comprising a firing chamber, means for feeding ammunition to the firing chamber, and means coöperating with the feeding means for lubricating the ammunition as it is being fed to the firing chamber.

4. A gun comprising a firing chamber, means for moving shells to and from the firing chamber, and means coöperating with the moving means for lubricating the firing chamber.

5. A gun comprising an ammunition holder, a firing chamber, means for feeding ammunition from the holder to the firing chamber, and means located between the holder and the firing chamber for lubricating the ammunition.

6. A gun comprising a firing chamber, and means for automatically lubricating the firing chamber, said means being arranged to apply lubrication to the ammunition before it enters the firing chamber.

7. A gun comprising a firing chamber, and means located outside of said chamber for lubricating said ammunition while in transit to said chamber.

8. A gun comprising a firing chamber, and means located in the path of travel of the ammunition to the firing chamber for lubricating the ammunition.

9. A gun comprising a firing chamber, and means for lubricating ammunition singly while in transit to the firing chamber.

10. A gun comprising a firing chamber, and means for automatically lubricating ammunition while in transit to the firing chamber.

11. A gun comprising a holder adapted to contain a plurality of pieces of ammunition, a firing chamber, means for feeding ammunition to the firing chamber, and means for lubricating each piece of ammunition in transit from its position in the holder to the firing chamber.

12. A gun comprising a holder adapted to contain a plurality of pieces of ammunition, a firing chamber, and means for successively feeding pieces of ammunition from the holder to the firing chamber, and means located between the holder and the firing chamber for lubricating each piece of ammunition while in transit.

13. A gun comprising a firing chamber, and a lubricant-carrying body arranged to contact with the ammunition.

14. A gun comprising a firing chamber, means for feeding ammunition to the firing chamber, and a lubricant-carrying body with which the ammunition contacts in transit to the firing chamber.

15. A gun comprising a firing chamber, and a lubricant-absorbent body arranged to contact with the ammunition.

16. A gun comprising a firing chamber, a lubricant-carrying body arranged to contact with the ammunition, and means for supplying lubricant to the said body.

17. A gun comprising a firing chamber, an absorbent body in the path of travel of the ammunition to the firing chamber, and having ducts for supplying oil to the body.

18. A gun comprising a firing chamber, a receiver chamber, and means located in the receiver chamber for lubricating ammunition in transit to the firing chamber.

19. A gun comprising a firing chamber, a receiver chamber, and one or more elongate lubricant-carrying bodies disposed longitudinally of the receiver chamber for lubricating ammunition in transit to the firing chamber.

20. A gun comprising a firing chamber, means for feeding ammunition to the firing chamber, and one or more elongate lubricant-carrying bodies disposed in and transversely to the path of travel of the ammunition to the firing chamber for lubricating the ammunition in transit.

21. A gun comprising a firing chamber, means for feeding ammunition to the firing chamber, and a lubricant-carrying body mounted in grooves in the gun in the path of travel of ammunition to the firing chamber for lubricating the ammunition in transit.

22. A gun comprising a firing chamber, means for feeding ammunition to the firing chamber, and a lubricant-carrying body mounted in under-cut grooves in the gun in the path of travel of ammunition to the firing chamber for lubricating the ammunition in travel.

23. A gun comprising a firing chamber, means for feeding ammunition to the firing chamber, a receiving chamber, and concave lubricating means mounted in the receiving chamber of the gun so that cartridges passing to the feeding chamber will contact with the concave means.

24. A gun comprising a firing chamber and means yieldingly mounted in the path of ammunition in transit to the firing chamber for lubricating the ammunition.

25. A gun comprising a firing chamber, a lubricant-carrying body mounted in the gun in the region of the path of ammunition in transit to the firing chamber, and means for yieldingly urging said body into said path.

26. A gun comprising an ammunition holder, a firing chamber, means for feeding ammunition from the holder to the firing chamber, and means located between any position of a piece of ammunition in the holder and the firing chamber for lubricating the ammunition.

In testimony whereof I have hereunto set my hand in presence of two subscribing witnesses.

JOHN T. THOMPSON.

Witnesses:
T. CLAY LINDSEY,
THEODORE H. EICKLUFF.